Figure 1:
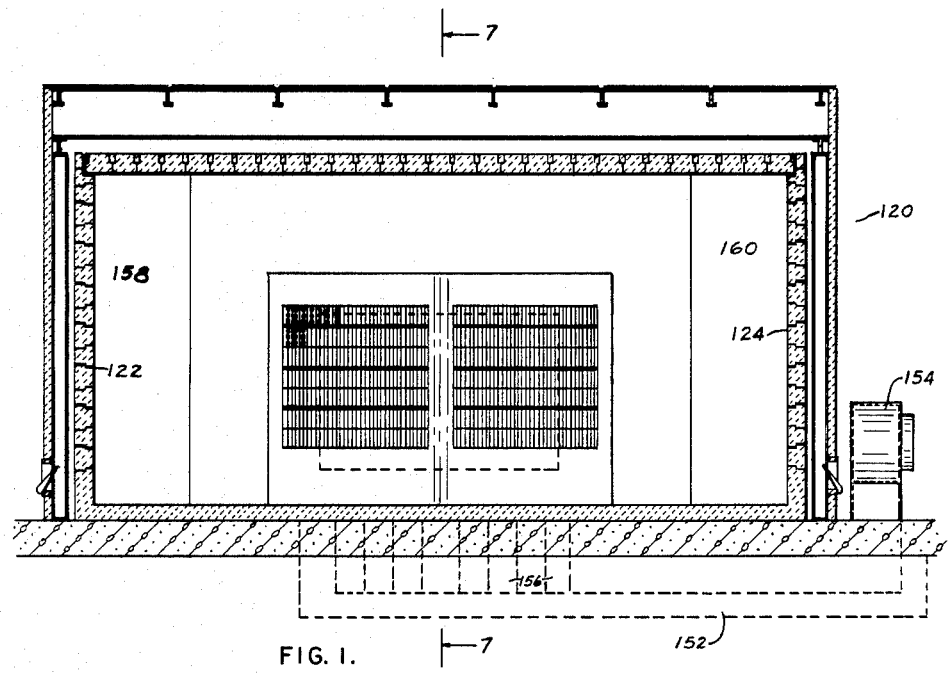

INVENTOR.
GEORGE P. REINTJES

United States Patent Office 3,236,508
Patented Feb. 22, 1966

3,236,508
AIR HEATING FURNACE
George P. Reintjes, Kansas City, Mo., assignor to Geo. P. Reintjes Co., Inc., Jackson, Mo., a corporation of Missouri
Filed July 23, 1962, Ser. No. 211,545
2 Claims. (Cl. 263—19)

This invention relates to a furnace for heating air, which air is subsequently utilized for the drying of various products such as coal, grains, or any other product which may require a large supply of heated air for drying purposes.

In the past, the drying of such products as above mentioned, has been limited and somewhat handicapped by the restricted capacity of air heating furnaces which are utilized to heat the air which is subsequently delivered to the drying apparatus. This has resulted from the fact that it was impossible to introduce into such air heating furnaces, a sufficient supply of outside air whereby to mix with the combustion gases in such a manner as to provide the necessary and desirable flow of air and gases of the desired temperature into the drying apparatus.

It is, therefore, the most important object of the present invention to provide an air furnace which has, as a part thereof, means for introducing a supplemental supply of outside air into the furnace enclosure, these means taking the form of supplemental air supply structure disposed within the furnace enclosure, the structure being in the form of a wall defining a central chamber, the wall having a plurality of air ports therein whereby supplemental air which is introduced into the chamber defined by the wall may subsequently pass into the interior of the enclosure, the air being introduced into the chamber either by forcing the same thereinto by a blower, or by allowing a natural draft flow of supplemental air.

A yet further aim is to provide an air heating furnace wherein the supplemental air supply structure takes the form of an upstanding pier disposed substantially centrally of the furnace enclosure, the walls of the pier defining a chamber, which chamber is in communication with a source of air, the walls of the pier being provided with air ports whereby air introduced into the chamber may subsequently enter the furnace enclosure.

It is another aim of this invention to provide an air heating furnace which will maximize the flow of gases and air therethrough through the utilization of an upstanding, hollow deflector pier disposed within the furnace enclosure and spaced inwardly from the outlet opening provided in one end wall of the furnace, the deflector pier having perforate walls, and there being means for introducing air into the deflector pier whereby the same may pass therethrough and into the interior of the furnace.

A yet further aim of the present invention is to provide an air heating furnace which has one end wall thereof provided with an outlet, the corners of said end wall as they join with corresponding corners of the two side walls being angled whereby to allow free flow of the air through the furnace and prevent eddying thereof.

Other objects include details of construction of the furnace enclosure; the deflector pier; and additional structural features which will become apparent from the following specification and accompanying drawings, wherein.

Figure 2:
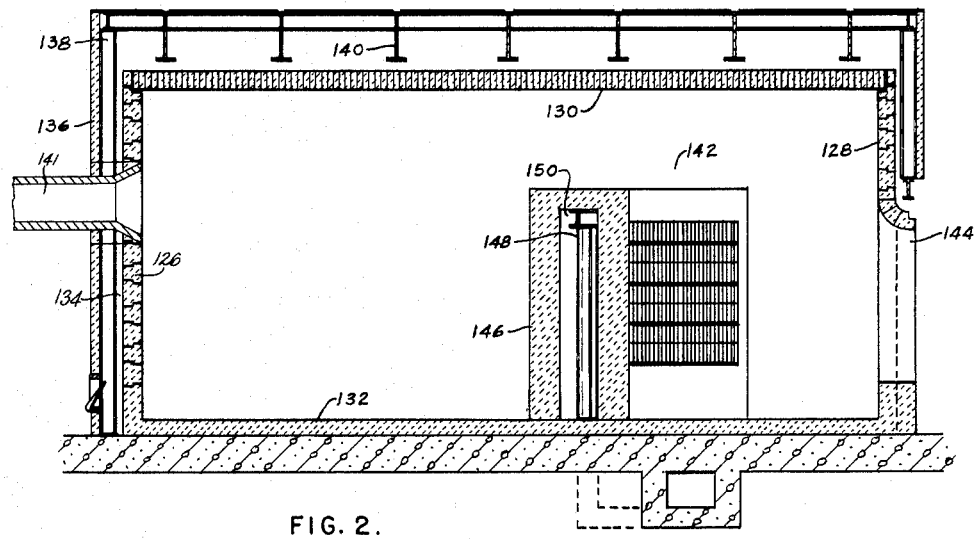

FIG. 1 is a transverse, sectional view of an air heating furnace embodying the present invention; and FIG. 2 is a longitudinal, sectional view taken on line 2—2 of FIG. 1.

The air heating furnace is designated as 120 and includes a pair of opposed side walls 122 and 124, a pair of opposed end walls 126 and 128, a roof 130, and a floor 132 whereby to define an enclosure 134. The enclosure 134 is surrounded by a casing 136, the vertical portions thereof being supported by a plurality of buckstays 138 which also support, through suitable hangers coupled thereto, the refractory wall tile from which the walls 122–128 are formed. The casing 136 adjacent roof 130 is supported by a network of horizontal beams 140, which beams also support, through suitable hangers, the refractory tile from which roof 130 is formed. A suitable burner 141 is positioned in end wall 126 for heating the air within the furnace.

The supplemental air supply structure takes the form of an upstanding pier 142 disposed within the enclosure 134 in a position spaced inwardly from the outlet opening 144 provided in end wall 128. The supplemental air is supplied to the interior of enclosure 134 through pier 142. To accomplish this result, the pier 142 is formed through the erection of wall structure 146 supported by columns such as 148 in such a manner as to define a central chamber 150. The columns 148 support through suitable hangers coupled thereto, refractory tile similar to that from which the walls 122–128 are formed, and which tile has a plurality of air ports therein whereby air introduced into central chamber 150 may pass therefrom into the enclosure 134.

The central chamber 150 is in communication with a source of air through a primary duct 152 coupled with a blower 154, which blower may be disposed at any desirable location adjacent the furnace 120. Thus, upon actuation of the blower 154, air is introduced into duct 152 and thence through branches such as 156 thereof, which branches 156 communicate with the central chamber 150 defined by the perforate walls 146 of pier 142. As is apparent, the air so introduced into the chamber 150 may thence pass outwardly through the air ports formed in the refractory tile which makes up walls 146 and into the interior of enclosure 134.

As is apparent, the pier 142 is of angled configuration being substantially V-shaped in plan configuration with the apex of the wall extending away from the outlet opening 144, this configuration serving to achieve a maximum mixing of air and gases within the enclosure 134 prior to the passage of the same therefrom through outlet opening 144. For the same purpose, the corner walls 158 and 160 of enclosure 134 are angled as seen in FIG. 2 of the drawings, whereby to create a tortuous path for the air flowing through enclosure 134 prior to its passage therefrom through outlet opening 144. Additionally, the pier 142 serves to deflect combustion gases which enter the enclosure 134 from the front thereof, and to prevent the same from passing directly out of outlet 144 without the mixing thereof with a suitable supply of air.

Having thus described the invention, what is claimed as new and desired to be secured by Letters Patent is:

1. An air heating furnace comprising an enclosure having side walls, end walls, a floor and a roof, there being an outlet opening in one of said end walls; corner walls joining the end wall having said outlet opening therein with corresponding side walls, said corner walls being angularly disposed with respect to said end wall and corresponding sides wall; means for heating the air within the furnace; and an upstanding pier disposed within said enclosure and spaced inwardly from said outlet opening, said pier being of sufficient width to prevent the direct passage of heated air through said outlet opening.

2. An air heating furnace as set forth in claim 1 said pier being V-shaped in plan configuration, the apex thereof extending away from said outlet opening.

(References on following page)

References Cited by the Examiner

UNITED STATES PATENTS

| | | | |
|---|---|---|---|
| 88,081 | 3/1869 | Salisbury | 110—64 |
| 811,089 | 1/1906 | Ricker | 110—64 |
| 1,137,048 | 4/1915 | Butterworth et al. | 110—73 |
| 1,973,016 | 9/1934 | Rainey | 126—114 |
| 2,606,513 | 8/1952 | Bailey | 110—68 |
| 2,776,631 | 1/1957 | Reintjes | 110—65 |
| 2,953,364 | 9/1960 | Reintjes | 263—19 |

WILLIAM F. O'DEA, *Acting Primary Examiner.*

JOHN J. CAMBY, CHARLES SUKALO, *Examiners.*